(12) United States Patent
Hao et al.

(10) Patent No.: US 11,926,909 B2
(45) Date of Patent: Mar. 12, 2024

(54) GAS-LIQUID SEPARATOR OF WATER ELECTROLYSIS SYSTEM

(71) Applicant: NATIONAL CHUNG SHAN INSTITUTE OF SCIENCE AND TECHNOLOGY, Taoyuan (TW)

(72) Inventors: Chia-Kan Hao, Taoyuan (TW); Kuan-Ting Lai, Taoyuan (TW); Chung-Yen Lu, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 449 days.

(21) Appl. No.: 17/400,147

(22) Filed: Aug. 12, 2021

(65) Prior Publication Data

US 2022/0186391 A1  Jun. 16, 2022

(30) Foreign Application Priority Data

Dec. 15, 2020  (TW) .................................. 109216682

(51) Int. Cl.
| | |
|---|---|
| *B01D 19/00* | (2006.01) |
| *B01D 61/36* | (2006.01) |
| *C25B 1/04* | (2021.01) |
| *C25B 1/50* | (2021.01) |
| *C25B 15/08* | (2006.01) |

(52) U.S. Cl.
CPC ........ *C25B 15/083* (2021.01); *B01D 19/0047* (2013.01); *B01D 19/0052* (2013.01); *B01D 19/0068* (2013.01); *B01D 61/363* (2022.08); *C25B 1/04* (2013.01); *C25B 1/50* (2021.01)

(58) Field of Classification Search
CPC ........... C25B 15/083; C25B 1/04; C25B 1/50; C25B 15/085; B01D 19/0047; B01D 19/0052; B01D 19/0068; B01D 61/363; B01D 19/0031; B01D 19/0036; B01D 19/0078; B01D 19/02
USPC .......... 96/155, 175–179, 188–191, 203, 208, 96/214; 95/242, 260, 261, 262
See application file for complete search history.

(56) References Cited

U.S. PATENT DOCUMENTS

2011/0072970 A1* 3/2011 Slobodzian .............. A61N 7/02
96/197

FOREIGN PATENT DOCUMENTS

WO   WO-2004000434 A1 * 12/2003 ......... B01D 19/0005

* cited by examiner

*Primary Examiner* — Frank M Lawrence, Jr.

(57) ABSTRACT

To provide a gas-liquid separator of a water electrolysis system, comprising: a liquid feeding atomizer and a gas-liquid separation chamber, wherein the liquid feeding atomizer includes a liquid feeding pressurized tube; and an atomizing spray head, in which the atomizing spray head converts a gas-liquid mixed liquor after pressurized by the liquid feeding pressurized tube into a mist droplet gas-liquid mixture. The gas-liquid separation chamber comprises a spiral flowing way, and the spiral flowing way extends the time that the mist droplet gas-liquid mixture spraying into the gas-liquid separation chamber flows downwards to the bottom of the gas-liquid separation chamber; an ultrasonic oscillation mechanism; a stirrer; an internal reservoir; and a filter mechanism, which performs the gas-liquid separation for unbroken bubbles in the mist droplet gas-liquid mixture through the pore difference.

11 Claims, 3 Drawing Sheets

GAS-LIQUID SEPARATOR OF WATER ELECTROLYSIS SYSTEM

CROSS-REFERENCE TO RELATED APPLICATION

This non-provisional application claims priority under 35 U.S.C. § 119(a) on Patent Application No(s). 109216682 filed in Taiwan, R.O.C. on Dec. 15, 2020, the entire contents of which are hereby incorporated by reference.

BACKGROUND OF THE INVENTION

1. Field of the Invention

The present disclosure relates to a gas-liquid separator, and in particular to a gas-liquid separator applied to a water electrolysis system.

2. Description of the Related Art

The term hydrogen economy is known to appear in the first energy crisis, mainly depicting hydrogen to replace oil in the future as the main energy to support the global economy, the entire hydrogen energy production, distribution, storage and use of the market operation system are developed, and the goal is to replace the existing oil economic system, and achieve the objective of environmental protection.

Because hydrogen energy has the following features, hydrogen energy is a green energy that can replace fossil fuels used in the combustion of internal combustion engines and turbines as the main way, and convert chemical energy into kinetic or electrical energy, thereby eliminating greenhouse gas emissions and pollution from engines.

Hydrogen is used without greenhouse gases and other pollutants, which is a clean fuel that can replace traditional fossil fuels and becomes a pollution-free fuel for power generation or transportation. Hydrogen is a common chemical element in the universe, and most of the hydrogen on Earth exists in the form of molecules, such as water and organic compounds. By electrolysis, water can be split into hydrogen and oxygen, and hydrogen is obtained. Hydrogen has a very high energy density per unit and a wide range of applications, which can be used as a fuel source for fuel cells and as fuel for industrial or transportation, directly used as fuel for power equipments in the transportation or industrial sectors.

The mainstream of water electrolysis is now divided into polymer electrolyte membrane water electrolysis (PEMEL), alkaline water electrolysis (AEL) and solid oxide electrolysis cell (SOEC). In terms of energy efficiency, polymer electrolyte membrane water electrolysis uses precious metal catalyst, resulting in higher cost of manufacturing electrodes, but it has a high proton conductivity that can work at lower temperatures and higher current densities. Polymer electrolyte membrane water electrolysis has a need for expensive perfluoro sulfonated proton membrane and platinum-based catalyst, resulting in the operation costs of polymer electrolyte membrane (PEM) electrolytic tank are too high. The operating temperature of solid oxide electrolysis cell is relatively high, which is limited for material selection and has corresponding cost of equipment construction.

The most commercially mature technology is alkaline water electrolysis, which uses a thick NaOH or KOH solution with a concentration of 20-30 wt % as electrolyte. However, because alkaline solutions is easy to react with $CO_2$ in the air to produce $K_2CO_3$, resulting in a high ohmic resistance loss, and thus it is usually operated at a relatively low current density (200-400 mA cm$^{-2}$). In addition, alkaline electrolytic cells are difficult to withstand transient loads, which may cause problems when paired with a renewable power. Because alkaline anion exchange membrane (AEM) electrolytic process integrates simplicity and user-friendly property of solid-state electrolytes and the use of low-cost alkaline compatible electrodes and hydrocarbon membranes that has attracted a wide attention. Although the AEM electrolytic cell achieves a high performance of hydrogen production in alkaline solutions, further research and development are needed. To date, most operations have used the same expensive catalysts as in the PEM electrolytic tank and continue to recycle NaOH/KOH electrolytes at relatively high concentrations (0.1-1.0M) to avoid producing high operating voltages.

In the state of use of high concentration alkaline electrolyte, electrolytic efficiency is improved with increased conductivity due to increased concentration, accompanied by a large number of gas production of electrodes, resulting in the gas-liquid separation effect of a high concentration of electrolyte containing bubbles is not good, so the phenomenon needs the solution design of a complete consideration. At present, In all the technologies on the market, the air conditioning system is a separation method that only designs a shear force flow field for pure water and air, only uses the flow rate difference to cause a shear energy, and this is not enough to separate a micro-bubbles system produced by electrode plates of the water electrolysis system, cannot be used in all alkaline water electrolysis system, and thus cannot be applied in practice.

BRIEF SUMMARY OF THE INVENTION

In view of the above disadvantages of the prior art, the device of the present invention makes up for the shortcomings of the invention of the aforementioned device by mixing physical methods, and for the characteristics of gas production of water electrolysis or alkaline water electrolysis, the efficiency of gas-liquid separation is accomplished by spraying, lengthening path, ultrasonic wave, perturbation and size screening.

Another objective of the invention is to perform a high efficiency of gas-liquid separation of a high concentration of a viscous liquid containing mixing $H_2$ or $O_2$ by physical methods. The principle is to spray a gas-liquid mixed solution into a gas-liquid separation chamber by an appropriate atomizer, a spiral flowing way on a wall edge of the gas-liquid separation chamber lengthens the process of the gas-liquid separation, and in the process of fluid flowing downwards, the methods comprises ultrasonic defoaming and bottom disturbance defoaming, using the pressure difference principle at an exhaust vent of the upper edge of the gas-liquid separation chamber to cause a local negative pressure that can effectively facilitate the gas-liquid separation. Finally, the gas is split and vented from the upper edge to obtain a high purity gas; the liquid on the lower edge is discharged and refluxed for use, and the remaining microbubbles are left in the cavity to enter a repeated separation cycle until the pure gas and liquid are discharged respectively. by the last filter mechanism.

To achieve the above objective, the invention provides a gas-liquid separator of a water electrolysis system, comprising a liquid feeding atomizer, including a liquid feeding pressurized tube for receiving and pressurizing a gas-liquid mixed liquor after performing the electrolytic reaction of water electrolysis system; and an atomizing spray head, which is connected to the liquid feeding pressurized tube, in which the atomizing spray head converts the gas-liquid mixed liquor after pressurized by the liquid feeding pressurized tube into a mist droplet gas-liquid mixture; and a gas-liquid separation chamber, the liquid feeding atomizer being set above the gas-liquid separation chamber, wherein the atomizing spray head sprays the mist droplet gas-liquid mixture into the gas-liquid separation chamber. The gas-liquid separation chamber comprises a spiral flowing way, which is set on an inner wall of the gas-liquid separation chamber, and when the mist droplet gas-liquid mixture is sprayed into the spiral flowing way, the spiral flowing way extends the time that the mist droplet gas-liquid mixture spraying into the gas-liquid separation chamber flows downwards to the bottom of the gas-liquid separation chamber; an ultrasonic oscillation mechanism, set on an outer wall of the gas-liquid separation chamber, which is used for oscillating the mist droplet gas-liquid mixture in the gas-liquid separation chamber; a stirrer, set at the bottom of the gas-liquid separation chamber, which is used to stir the mist droplet gas-liquid mixture accumulated in a lower layer of the gas-liquid separation chamber at a high speed; an internal reservoir, located in the gas-liquid separation chamber, which is used to store and discharge a liquid in the mist droplet gas-liquid mixture after the gas-liquid separation; and a filter mechanism, located at the top of the internal reservoir, which performs the gas-liquid separation for unbroken bubbles in the mist droplet gas-liquid mixture through the pore difference.

In the above description, the gas-liquid separator further comprises a liquid discharging pipe, connected to the internal reservoir, and the liquid after the gas-liquid separation is discharged from the gas-liquid separation chamber through the liquid discharging pipe; an exhaust pipe, connected to the gas-liquid separation chamber, and a gas after the gas-liquid separation is discharged from the gas-liquid separation chamber through the exhaust pipe; a differential pressure valve, connected to the exhaust pipe, and used to adjust the exhaust pipe to be a negative pressure; and a gas collection pipe, connected to the differential pressure valve, and used to collect the gas after the gas-liquid separation.

In the above description, the gas-liquid separator further comprises an external pipe, which is communicated to the liquid discharging pipe and the differential pressure valve, and used to collect a remaining small amount of gas in the liquid that is discharged from the gas-liquid separation chamber.

In the above description, a diameter range of a spout of the atomizing spray head is between 0.5 mm and 5 mm.

In the above description, a material of the liquid feeding atomizer is at least one of stainless steel, aluminum alloy, nickel alloy, titanium alloy and zirconium alloy.

In the above description, a lining material of the gas-liquid separation chamber is at least one of Teflon® liner, Teflon® coating, polyethylene liner and polyethylene coating.

In the above description, a material of the liquid discharging pipe, the exhaust pipe and the external pipe is at least one of Teflon® liner, Teflon® coating, polyethylene liner and polyethylene coating.

In the above description, a material of the spiral flowing way is at least one of Teflon® and polyethylene.

In the above description, an oscillation frequency of the ultrasonic oscillation mechanism is between 20 kHz and 50 kHz.

In the above description, the ultrasonic oscillation mechanism is attached to the outside of the gas-liquid separation chamber in at least one manner of a plate and annular plate.

In the above description, the stirrer provides a stirring action by a mechanical way at least one of fan blades, paddle boards or a magnetic stirring stone.

In the above description, the number of layers of the filter mechanism is more than one.

In the above description, the filter mechanism has a mesh size of 16-400 meshes or a hole size of 0.05 mm-1 mm.

In the above description, a material of the filter mechanism is one of the stainless steel, aluminum alloy, nickel alloy, titanium alloy and zirconium alloy.

In the above description, a liquid viscosity of the gas-liquid mixed liquor is greater than 10 cps.

In the above description, a surface of spiral flowing way is an annular or groove-shaped protrusion, and a pitch of the spiral flowing way is between 0.5 mm and 2.5 mm, and a height of thread of the spiral flowing way is between 0.5 mm and 1.5 mm.

In the above description, chemical properties of the annular or groove-shaped protrusion are hydrophilic.

The above summary description and the following detailed description and the accompanying drawings are the way, means and effect made for further describing the invention which can achieve a predetermined object. Other objects and advantages of the invention will become apparent from the following description and the drawings.

DETAILED DESCRIPTION OF THE INVENTION

The implementation of the invention is further described by the specific embodiments together with the attached drawings as below, and a person having ordinary skill in the art can easily understand other advantages and effects of the present invention by the disclosure of the specification.

Figure 1:
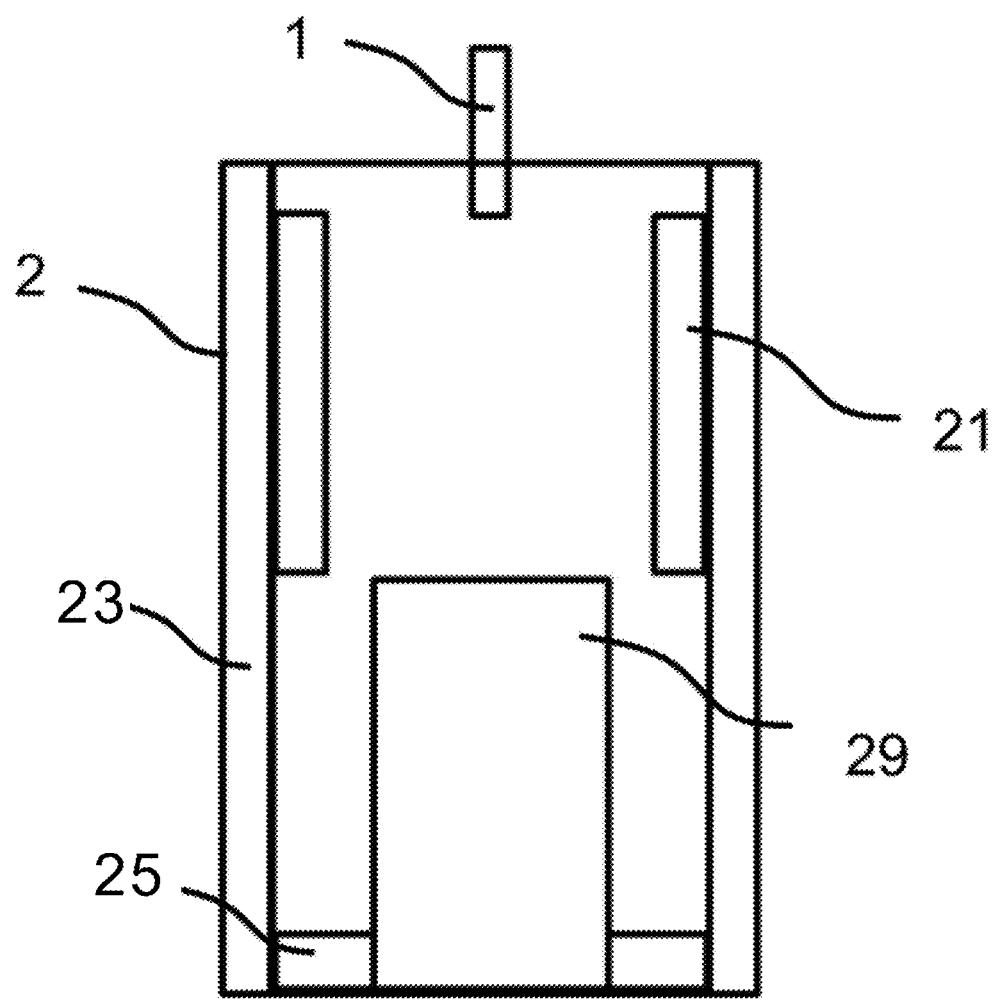
FIG. 1 is a schematic view of a gas-liquid separator of a water electrolysis system of the present disclosure.
Figure 2:
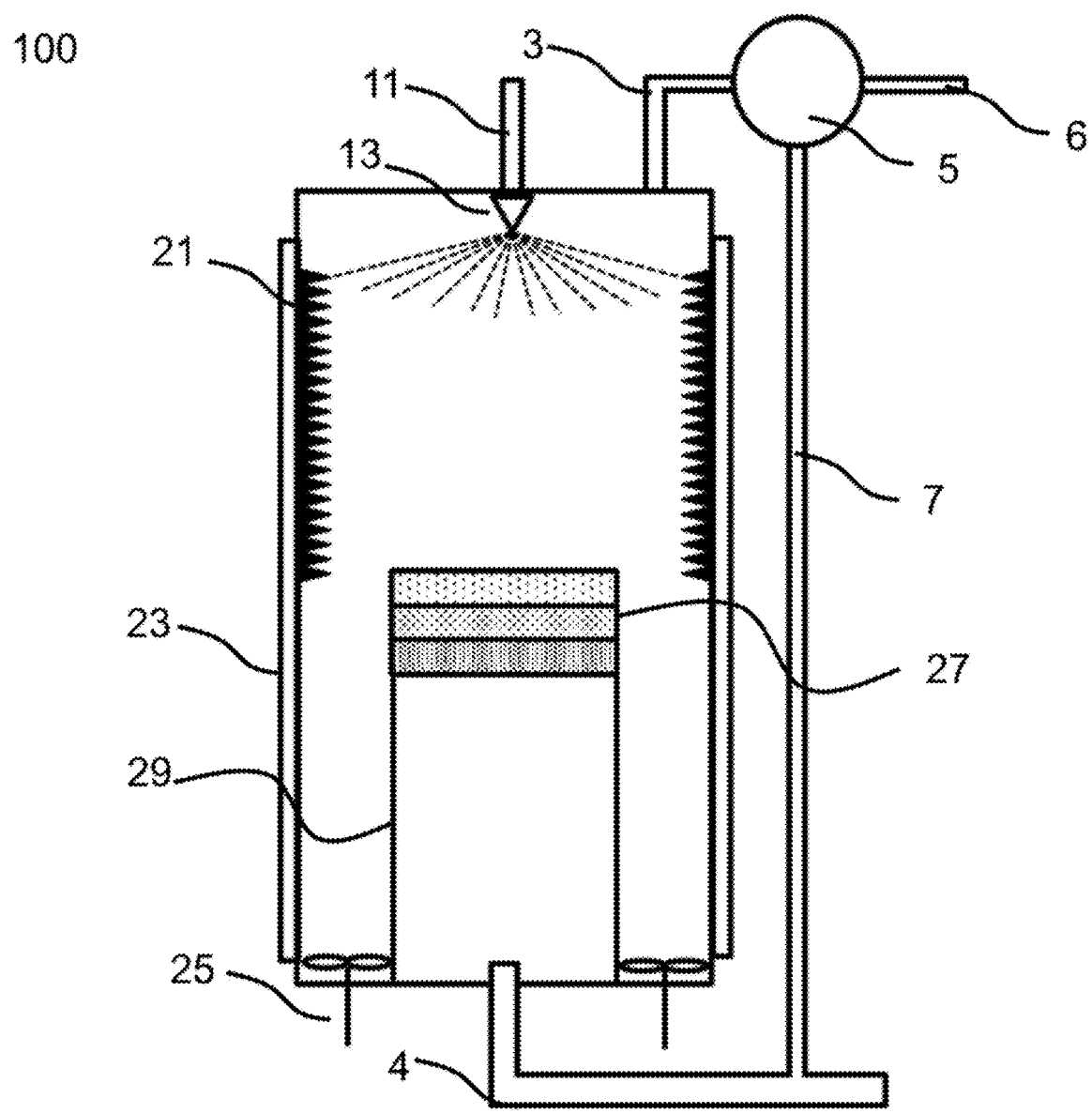
FIG. 2 is a schematic view showing an internal profile of the gas-liquid separator of the water electrolysis system of the present disclosure.

The invention provides a gas-liquid separator of a water electrolysis system, referring to FIGS. 1 and 2, FIG. 1 is a schematic view of the gas-liquid separator of the water electrolysis system of the present invention; FIG. 2 is a schematic view showing an internal profile of the gas-liquid separator of the water electrolysis system of the present invention.

At first, referring to FIGS. 1 and 2, and explaining the outline of the gas-liquid separator in the present embodiment, the present invention of a gas-liquid separator 100 of a water electrolysis system comprises a liquid feeding atomizer 1, having a liquid feeding pressurized tube 11 and an atomizing spray head 13, an electrolyte (gas-liquid mixed liquor) is atomized to spray into a cavity of a gas-liquid separation chamber 2 by the atomizing spray head 13; the gas-liquid separation chamber 2 comprises: a spiral flowing way 21, which is set on an inner side wall of the gas-liquid separation chamber 2. The spiral flowing way 21 has a liner, the electrolyte (gas-liquid mixed liquor) is sprayed out dispersive mist droplets through the atomizing spray head 13 to become a mist droplet gas-liquid mixture. The dispersive angle of the spray may range from 45 to 130 degrees, in which the mist droplets (the mist droplet gas-liquid mixture) more than 60 degrees are flowing downwards through the liner of the spiral flowing way. An ultrasonic oscillation mechanism 23 is an ultrasonic patch located on an outer side wall of the gas-liquid separator, the gas-liquid mixed liquor flowing through the spiral flowing way 21 is performed a first procedure of defoaming by the ultrasonic patch of the ultrasonic oscillation mechanism 23. A stirrer 25 is set at the bottommost portion of the gas-liquid separation chamber 2, and when the mist droplet gas-liquid mixture after performing the first procedure of defoaming gathers at the bottom of the gas-liquid separation chamber 2, the mist droplet gas-liquid mixture is stirred by the stirrer 25 to perform a second procedure of defoaming. A filter mechanism 27 has at least one layer of filter, and the mist droplet gas-liquid mixture after performing the second procedure of defoaming will overflow over time to the top of an internal reservoir 29 and flow through the filter mechanism 27 for the last gas-liquid separation, the liquid after the last gas-liquid separation may enter the internal reservoir 29.

The water electrolysis system of the invention may be a general water electrolysis system or an alkaline water electrolysis system, and a liquid viscosity of the gas-liquid mixed liquor (electrolytic water) in the system is greater than 10 cps, but not limited to herein.

Next, referring to FIGS. 1 and 2, the various components of the gas-liquid separator of the embodiment are described.

<Liquid Feeding Atomizer>

The liquid feeding atomizer 1 comprises a liquid feeding pressurized tube 11 for receiving and pressurizing the gas-liquid mixed liquor after performing the electrolytic reaction of water electrolysis system; and an atomizing spray head 13, which is an atomizing nozzle with micropores, connected to the liquid feeding pressurized tube 11, in which the atomizing spray head 13 converts the gas-liquid mixed liquor after pressurized by a pump pipe of the liquid feeding pressurized tube 11 into a mist droplet gas-liquid mixture, and sprayed into the gas-liquid separation chamber 2.

In the embodiment, a negative pressure is produced by using a high-speed flowing fluid passing through the nozzle in an ejector with the hydrodynamic force, the emitted high-speed fluid forms a high-speed kinetic energy in a suction chamber of the gas-liquid separation chamber, so that the pressure in the suction chamber is reduced to a certain degree of vacuum. Next, the foam is sucked into a mixing chamber of the gas-liquid separation chamber, which expands and bursts due to the pressure difference between the inside and outside of the foam.

In the embodiment, a diameter range of a spout of the atomizing spray head 13 is between 0.5 mm and 5 mm, and the gas-liquid mixed liquor is converted into a mist droplet gas-liquid mixture.

In the embodiment, in order to prevent corrosion of electrolytic water, a material of the liquid feeding atomizer 1 may be at least one of stainless steel, aluminum alloy, nickel alloy, titanium alloy and zirconium alloy, but not limited to herein.

<Gas-Liquid Separation Chamber>

The gas-liquid separation chamber 2 comprises a spiral flowing way 21, an ultrasonic oscillation mechanism 23, a stirrer 25 and a filter mechanism 27.

In the gas-liquid separation chamber 2 of the embodiment, in order to prevent corrosion of electrolytic water, a lining material of the gas-liquid separation chamber 2 may be at least one of Teflon® liner, Teflon® coating, polyethylene liner and polyethylene coating, but not limited to herein.

The spiral flowing way 21 is set on an inner wall of the gas-liquid separation chamber 2, and when the mist droplet gas-liquid mixture is sprayed into the spiral flowing way 21, the spiral flowing way extends the time that the mist droplet gas-liquid mixture spraying into the gas-liquid separation chamber 2 flows downwards to the bottom of the gas-liquid separation chamber 2.

In the embodiment, a surface of spiral flowing way 21 is an annular or groove-shaped protrusion, the protrusion can extend the retention time of the mist droplet gas-liquid mixture in the flowing way, has the effect of shortening the body height of gas-liquid separation chamber 2, and chemical properties of the annular or groove-shaped protrusion can be chosen to be hydrophilic or hydrophobic according to the chemical characteristics of the gas and liquid composition to be separated.

In the embodiment, a pitch of the spiral flowing way 21 is between 0.5 mm and 2.5 mm, and a height of thread of the spiral flowing way is between 0.5 mm and 1.5 mm, so that the flow rate of fluid containing gas and liquid can be controlled when the height of thread of the spiral flowing way is 0.5 mm-1.5 mm to achieve the adjustability of the retention time.

The ultrasonic oscillation mechanism 23 is set on an outer wall of the gas-liquid separation chamber 2, which is used for oscillating the mist droplet gas-liquid mixture in the gas-liquid separation chamber 2, and an ultrasonic defoaming used in the embodiment is that a high-speed oscillation with 25,000 times per second-46,000 times per second is conducted in the liquid of the mist droplet gas-liquid mixture to produce an effect of pushing medium, causing pressure changes among the molecules of the liquid, and the bubbles in the liquid will grow and expand gradually with the vibration of the ultrasonic waves, and then suddenly burst and split.

The stirrer 25 is set at the bottom of the gas-liquid separation chamber 2, which is used to stir the mist droplet gas-liquid mixture accumulated in a lower layer of the container at a high speed. At the high-speed stirring process, different shear phenomena can be produced in the water flow layer to provide the energy of bubbles breaking in the electrolyte.

In the embodiment, the stirrer 25 can provide a stirring action by a mechanical way of fan blades, paddle boards or a magnetic stirring stone, but not limited to herein. The centrifugation method used in the embodiment is to make use of the centrifugal action of the centrifuge impeller with a high-speed rotation and they produce a sufficient large impact on the wall of a container (e.g. gas-liquid separation chamber) when rotating, so that the foam is broken and defoamed, and the present invention is combined with other defoaming methods, so that the overall defoaming effect is better.

The internal reservoir 29 is located in the gas-liquid separation chamber 2, and is used to store the mist droplet gas-liquid mixture and discharge a liquid after the gas-liquid separation. A material of the internal reservoir 29 may be at least one of Teflon® liner, Teflon® coating, polyethylene liner and polyethylene coating, but not limited to herein. Depending on the acidity and alkalinity of the mist droplet gas-liquid mixture to be treated, it is possible to choose the suitable material for the internal reservoir 29.

The filter mechanism 27 is located at the top of the internal reservoir 29, which performs the gas-liquid separation for unbroken bubbles in the mist droplet gas-liquid mixture through the pore difference. In the embodiment, filters of the upper, middle and lower layers of the filter mechanism 27 may be composed of a coarse filter, a medium filter and a fine filter, because a bubble size generated under different current densities is 0.05 mm-1 mm, and a hole size that is too small will cause fluid pressure resistance to rise excessively, the filter mechanism 27 of the present invention has a mesh size of 16-400 meshes or a hole size of 0.05 mm-1 mm. In addition, in order to prevent corrosion, a material of the filter mechanism 27 can be one of stainless steel, aluminum alloy, nickel alloy, titanium alloy and zirconium alloy. The filter mechanism 27 of the embodiment applies the related principles of compression method for defoaming, which compresses bubbles to burst by external forces that places a grid or filter on the foam, compresses the grid or filter downwards, breaks the bubbles with a method using grid or mesh. The material of the grid or filter contacting bubbles also has an influence on breaking bubbles. When the grid or mesh is smaller than a bubble, bubbles cannot pass and it is favorable to break bubbles, so the filter mechanism 27 of the embodiment breaks the unbroken bubbles through the pore difference.

The gas-liquid separation chamber 2 of the embodiment may be externally connected to a liquid discharging pipe 4, which connects to the internal reservoir 29, and the liquid after the gas-liquid separation is discharged from the gas-liquid separation chamber 2 through the liquid discharging pipe 4.

In the embodiment, an exhaust pipe 3 may be connected to a differential pressure valve 5, the differential pressure valve 5 can use the pressure difference principle in the exhaust pipe 3 to form a local negative pressure, in order to effectively facilitate the gas-liquid separation. Finally, the gas after the gas-liquid separation is collected by a gas collection pipe 6 connected to the differential pressure valve 5, and the high purity gas is obtained.

In the embodiment, the gas collection pipe 6 may be externally connected to a gas storage cylinder (not shown in the figures) and the gas collected is transported to the gas storage cylinder (not shown in the figures) for storage.

In the embodiment, in order to prevent corrosion of electrolytic water, a material of the liquid discharging pipe 4 and exhaust pipe 3 may be at least one of Teflon® liner, Teflon® coating, polyethylene liner and polyethylene coating, but not limited to herein.

In another embodiment of the present invention, the differential pressure valve 5 can further be connected to an external pipe 7. The differential pressure valve 5 can also make the external pipe 7 form a local negative pressure, so that a remaining small amount of gas in the liquid that is discharged from the gas-liquid separation chamber 2 is transported to the gas collection pipe 6 for collection through the external pipe 7 and differential pressure valve 5.

In another embodiment of the present invention, in order to prevent corrosion of electrolytic water, a material of a liner of the external pipe 7 may be at least one of Teflon® liner, Teflon® coating, polyethylene liner and polyethylene coating, but not to herein.

In another embodiment of the present invention, the liquid discharging pipe 4 may further be connected to an electrolyte reflux pipe (not shown in the figures), and the liquid (electrolytic liquid) after the gas-liquid separation may be refluxed to an electrolyte reservoir (not shown in the figures) through the electrolyte reflux pipe.

Figure 3:
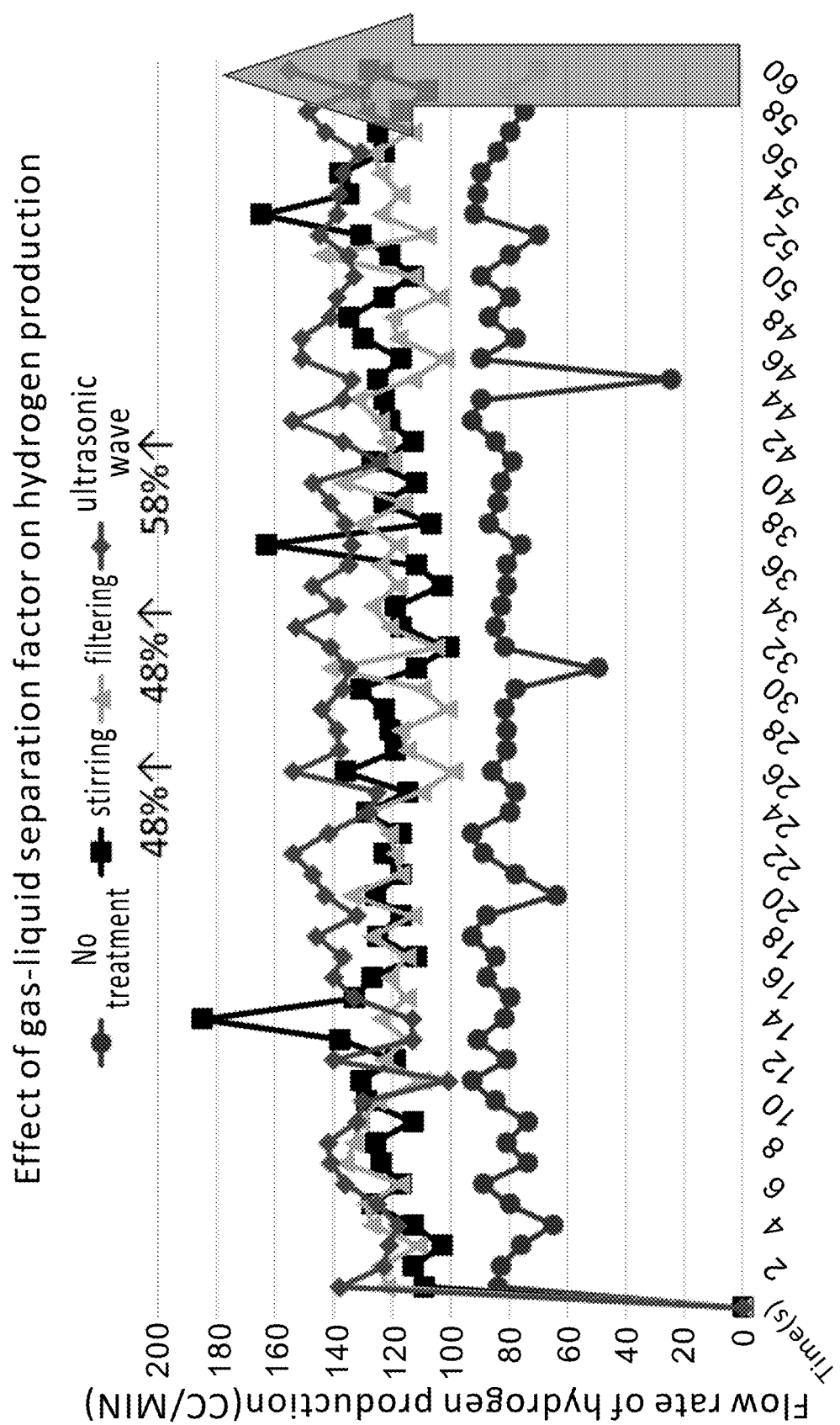
FIG. 3 is a graph showing individual separation reaction of hydrogen produced by electrolytic cell with a single gas separation factor.

Referring to FIG. 3, FIG. 3 is a graph showing individual separation reaction of hydrogen produced by electrolytic cell with a single gas separation factor, and the individual separation reaction of hydrogen produced by electrolytic cell with a single gas separation factor is carried out, and the flow rate of a gas produced is recorded in real time. At the same electrolytic voltage, the gas-liquid separation effects obtained by stirring, filtration and ultrasonic oscillation are increased by 48%, 48% and 58% respectively.

The above embodiments of the invention made only by way of example to describe the feature and effect of the invention, and it should not be considered as the scope of substantial technical content is limited thereby. Various possible modifications and alternations of the embodiments could be carried out by the those of ordinary skill in the art without departing from the spirit and scope of the invention. Therefore, the scope of the invention is based on the appended claims.

What is claimed is:

1. A gas-liquid separator of a water electrolysis system, comprising:
  a liquid feeding atomizer, including:
    a liquid feeding pressurized tube, for receiving and pressurizing a gas-liquid mixed liquor after performing electrolytic reaction of the water electrolysis system; and
    an atomizing spray head, which is connected to the liquid feeding pressurized tube, in which the atomizing spray head converts the gas-liquid mixed liquor after pressurized by the liquid feeding pressurized tube into a mist droplet gas-liquid mixture; and
  a gas-liquid separation chamber, the liquid feeding atomizer being set above the gas-liquid separation chamber, wherein the atomizing spray head sprays the mist droplet gas-liquid mixture into the gas-liquid separation chamber, wherein the gas-liquid separation chamber comprises:
    a spiral flowing way, which is set on an inner wall of the gas-liquid separation chamber, and when the mist droplet gas-liquid mixture is sprayed into the spiral flowing way, the spiral flowing way extends the time that the mist droplet gas-liquid mixture spraying into the gas-liquid separation chamber flows downwards to the bottom of the gas-liquid separation chamber;
    an ultrasonic oscillation mechanism, set on an outer wall of the gas-liquid separation chamber, which is used for oscillating the mist droplet gas-liquid mixture in the gas-liquid separation chamber;
    a stirrer, set at the bottom of the gas-liquid separation chamber, which is used to stir the mist droplet gas-liquid mixture accumulated in a lower layer of the gas-liquid separation chamber at a high speed;
    an internal reservoir, located in the gas-liquid separation chamber, which is used to store and discharge a liquid in the mist droplet gas-liquid mixture after the gas-liquid separation; and
    a filter mechanism, located at the top of the internal reservoir, which performs the gas-liquid separation for unbroken bubbles in the mist droplet gas-liquid mixture through a pore difference.

2. The gas-liquid separator according to claim 1, wherein the gas-liquid separator further comprises:
  a liquid discharging pipe, connected to the internal reservoir, and the liquid after the gas-liquid separation is discharged from the gas-liquid separation chamber through the liquid discharging pipe;

an exhaust pipe, connected to the gas-liquid separation chamber, and a gas after the gas-liquid separation is discharged from the gas-liquid separation chamber through the exhaust pipe;

a differential pressure valve, connected to the exhaust pipe, and used to adjust the exhaust pipe to be a negative pressure; and a gas collection pipe, connected to the differential pressure valve, and used to collect the gas after the gas-liquid separation.

3. The gas-liquid separator according to claim 2, wherein the gas-liquid separator further comprises:

an external pipe, which is communicated to the liquid discharging pipe and the differential pressure valve, and used to collect a remaining small amount of gas in the liquid that is discharged from the gas-liquid separation chamber.

4. The gas-liquid separator according to claim 1, wherein a diameter range of a spout of the atomizing spray head is between 0.5 mm and 5 mm.

5. The gas-liquid separator according to claim 1, wherein an oscillation frequency of the ultrasonic oscillation mechanism is between 20 kHz and 50 kHz.

6. The gas-liquid separator according to claim 1, wherein the ultrasonic oscillation mechanism is attached to the outside of the gas-liquid separation chamber in at least one manner of a plate and annular plate.

7. The gas-liquid separator according to claim 1, wherein the stirrer provides a stirring action by a mechanical way at least one of fan blades, paddle boards or a magnetic stirring stone.

8. The gas-liquid separator according to claim 1, wherein the number of layers of the filter mechanism is more than one.

9. The gas-liquid separator according to claim 1, wherein the filter mechanism has a mesh size of 16-400 meshes or a hole size of 0.05 mm-1 mm.

10. The gas-liquid separator according to claim 1, wherein a liquid viscosity of the gas-liquid mixed liquor is greater than 10 cps.

11. The gas-liquid separator according to claim 1, wherein a surface of the spiral flowing way is an annular or groove-shaped protrusion, and a pitch of the spiral flowing way is between 0.5 mm and 2.5 mm, and a height of thread of the spiral flowing way is between 0.5 mm and 1.5 mm.

* * * * *